Nov. 7, 1961 A. E. MOULTON ET AL 3,007,712
VEHICLE SUSPENSIONS HAVING HYDRAULICALLY EFFECTED
DIFFERENTIAL INTERACTION BETWEEN
FRONT AND REAR WHEELS
Filed May 15, 1959 7 Sheets-Sheet 1
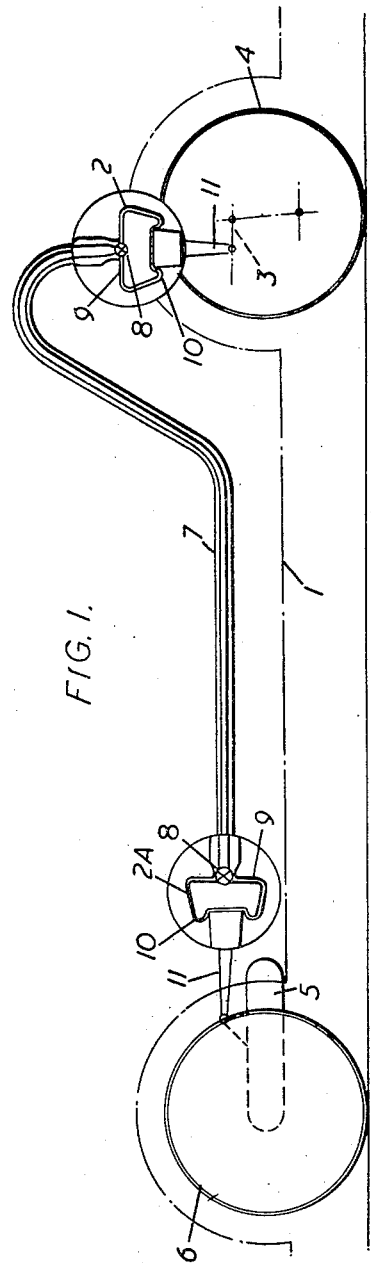
FIG. I.
Inventors
ALEXANDER ERIC MOULTON
Philip WILSON TURNER
By
Shoemaker & Mattare
Attorneys

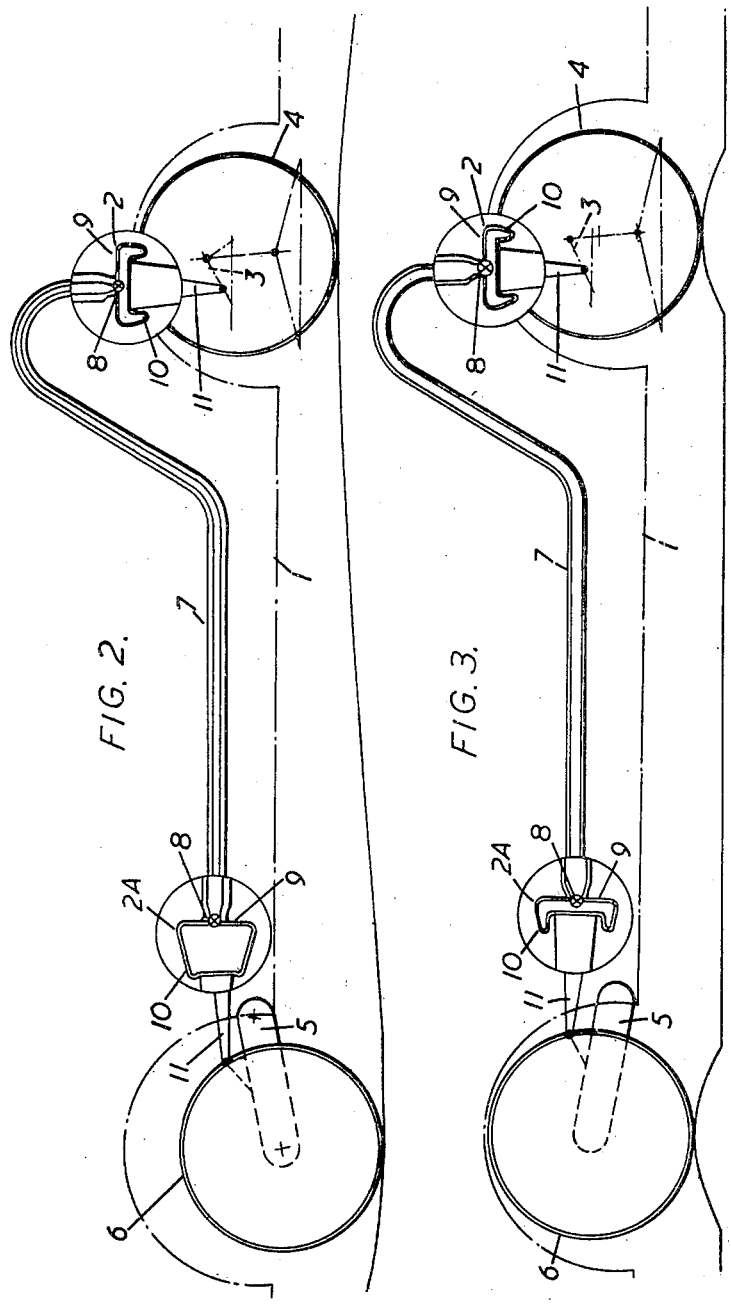

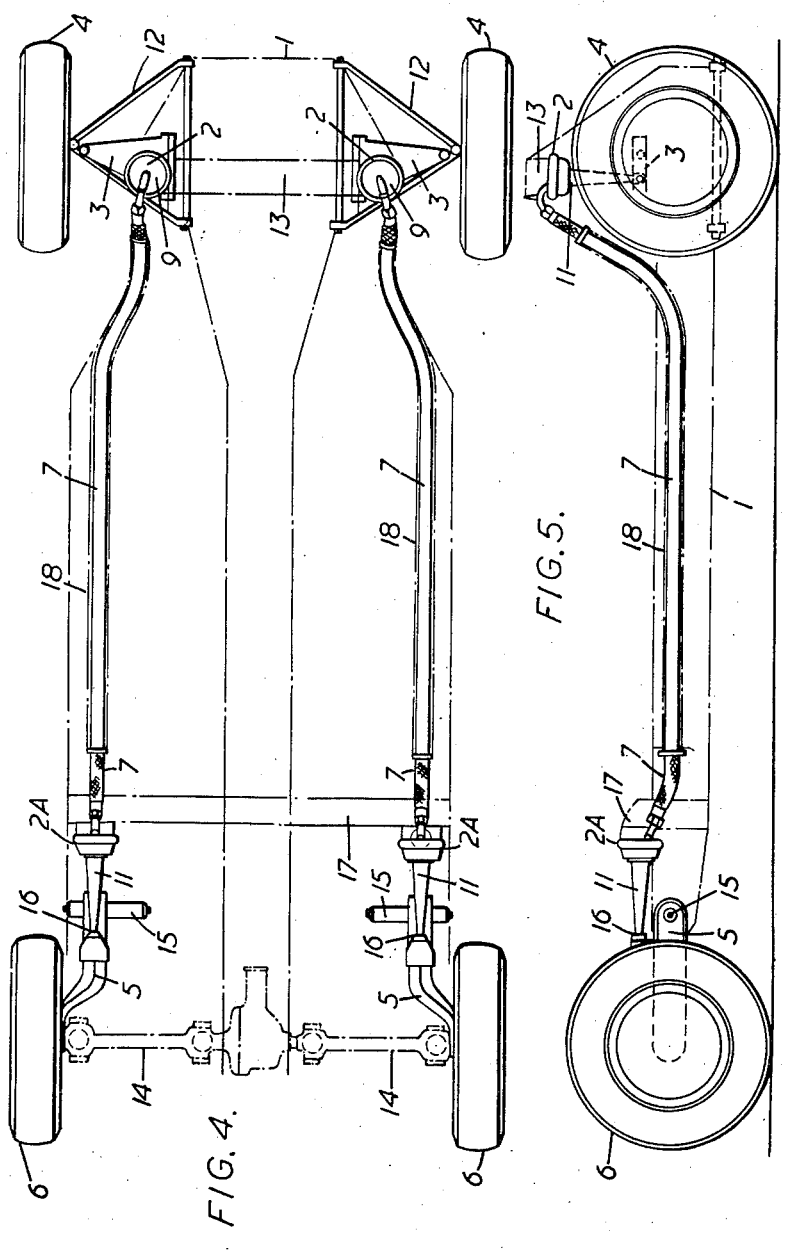

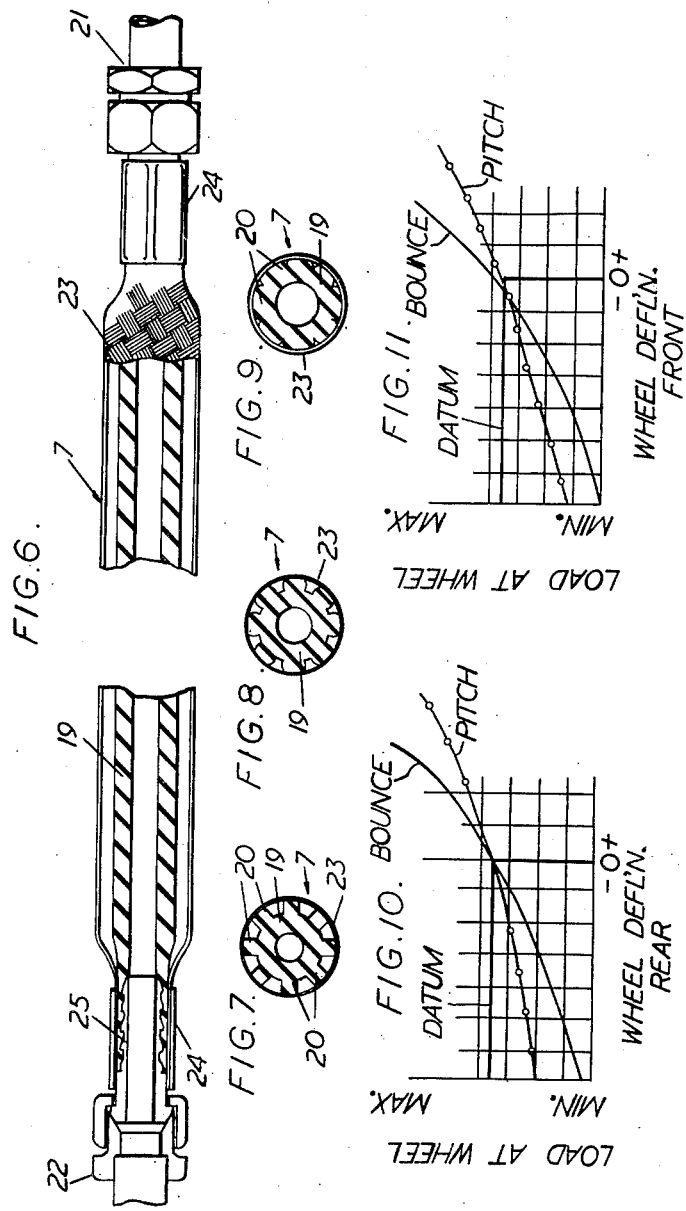

Inventors
ALEXANDER ERIC MOULTON
PHILIP WESTON TURNER
By
Shoemaker + Mattare
Attorneys United States Patent Office 3,007,712
Patented Nov. 7, 1961

3,007,712
VEHICLE SUSPENSIONS HAVING HYDRAULICALLY EFFECTED DIFFERENTIAL INTERACTION BETWEEN FRONT AND REAR WHEELS
Alexander Eric Moulton, Bradford-on-Avon, and Philip Wilson Turner, Cambridge, England, assignors to Moulton Developments Limited, Bradford-on-Avon, England, a British company
Filed May 15, 1959, Ser. No. 813,564
6 Claims. (Cl. 280—104)

This invention relates to suspension systems for automotive vehicles, of the conjugate hydraulic type; and provision for effecting hydraulically, differential interaction between front and rear wheel-suspension means located on the same side of the vehicle.

According to the present invention a suspension system for automotive vehicles, of the type specified above, comprises a pair of separate hermetically-sealed and liquid-filled hydraulic systems interconnecting longitudinally the front and rear wheel-suspension means at the respective sides of the vehicle and each including a pair of diaphragm-type hydraulic displacer units associated individually with the respective interconnected wheel-suspension means, the suspension systems at the respective sides of the vehicle each including one or more springs, each comprising a rubber hydraulic accumulator having an elastic wall, in which increase in hydraulic pressure resulting from deflection of the respective wheel suspensions produces resilient deformation of the elastic wall, thereby providing springing in bounce and/or roll, and wherein there are included two-way rubber flap valves individual to each displacer unit which damp the suspension by controlling the passage of liquid to and from the interconnected displacer units; and means for providing a relatively small restoring force in the pitching mode of the suspension. The purpose of the last-mentioned means is also to minimise variation of the attitude (i.e. fore-and-aft trim) of the vehicle with variation of its loading.

The relatively small restoring force necessary in the pitching mode of the improved suspension system is preferably derived at least in part from the geometry of the suspension linkage at one end of the vehicle by so arranging the connection of this linkage to the associated displacer unit that a decrease of mechanical advantage results as the wheel of the linkage concerned moves from the rebound to the bump condition.

Referring to the accompanying drawings:

FIGURE 1 is a diagrammatic side elevation illustrating the principle and general arrangement of a motor vehicle suspension system in accordance with the invention, the system being depicted in the static condition;

FIGURES 2 and 3 are further diagrammatic side elevations illustrating the behaviour of the suspension system in conditions of pitch and bounce respectively;

FIGURES 4 and 5 represent a practical embodiment of the improved suspension system, in plan view and in side elevation respectively;

FIGURE 6 is a plan view, partly in longitudinal section, of a rubber hose until encased in a rigid sleeve, this unit constituting the bounce spring of the conjugate suspension at each side of the vehicle;

FIGURES 7 to 9 are transverse sections of the hose unit of FIGURE 6 in the "free," "statically-loaded" and "bump" condition respectively;

FIGURES 10 and 11 are typical load/deflection curves in the bouncing and pitching modes of the improved suspension system, for the rear and front wheels respectively;

Figure 12:
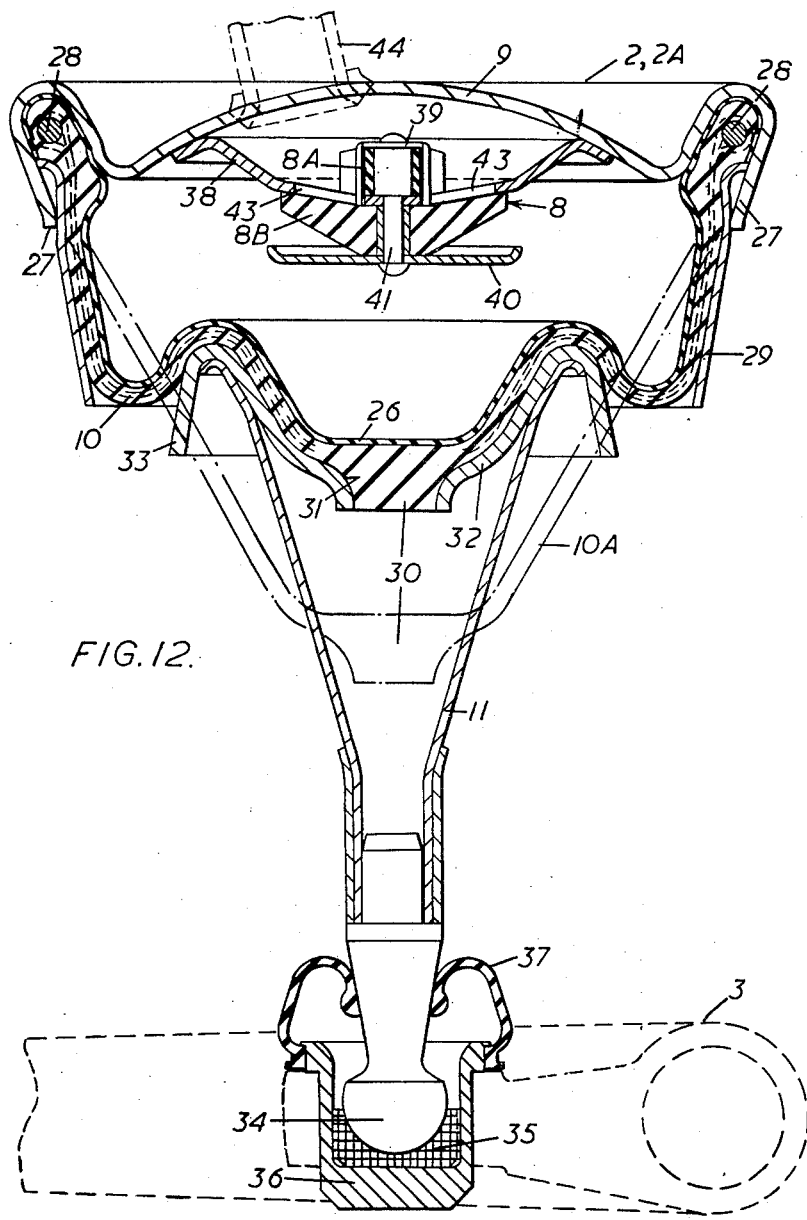
FIGURE 12 is an enlarged sectional side elevation of a hydraulic displacer unit, one of which is associated individually with each wheel of the vehicle.

The manner in which the improved suspension system operates will first be explained with reference to FIGURES 1 to 3. A motor vehicle, of which the underframe structure is indicated at 1, has its entire sprung load supported by liquid (which may conveniently be water with anti-freeze and anti-corrosion additives) contained under a pressure of about 150 p.s.i. (static) in two substantially identical hermetically-sealed hydraulic systems which are quite separate from each other. These hydraulic systems each comprise a front displacer unit 2, operable by a suspension arm 3 of one of the front wheels 4; a rear displacer unit 2A, operable by a suspension arm 5 of the rear wheel 6 at the same side of the vehicle; a resilient hose 7 interconnecting the corresponding front and rear displacer units 2 and 2A; and two-way damper valves 8 controlling the passage of hydraulic fluid to and from the respective displacer units. The latter are ringed in FIGURES 1 to 3, as though viewed through a magnifier.

The construction of the hydraulic displacer units 2, 2A will be described in detail later with reference to FIGURE 12, and, for the present, it will suffice to mention that each comprises a rigid head 9, which bears against an abutment on the vehicle frame 1, and a flexible diaphragm 10 that is connected by a ball-jointed strut 11 to the corresponding wheel-suspension linkage.

As each of the two hermetically-sealed hydraulic systems is completely filled with liquid under the static pressure already indicated, it will be appreciated that any vertical movement of one of the road wheels relative to the underframe 1 results in displacement of hydraulic fluid from one end to the other of the system concerned, under the control of the damper valves 8.

In the static condition represented in FIGURE 1, the front and rear displacer units 2, 2A contain substantially the same volume of liquid. But in the pitching mode of the suspension (FIG. 2) the liquid is displaced at nearly constant pressure, from one displacer unit (in this instance the front unit 2) and impelled through the interconnecting hose 7 to the displacer unit at the other end, but at the same side, of the vehicle. The displacer units 2, 2A are designed so that the effective area of the diaphragm 10 is variable during its travel. As the effective area of this diaphragm increases in one displacer unit, it decreases in the associated displacer unit at the opposite end of the vehicle. Consequently, the displacement of hydraulic fluid from one unit to the other engenders a small rise of pressure in the system. This increment of pressure results in a temporary distension of the bore of the resilient hose 7, the latter serving as a hydraulic accumulator. The extent of the radial distension of its bore is limited in a manner which will be explained later.

The restoring force in the pitching mode (FIG. 2) is afforded by the geometry of the rear suspension in conjunction with the above-mentioned variation of the effective area of the diaphragm of the respective displacer units. This restoring force is relatively small, resulting in the pitching frequency being desirably low and of the order of only 50 to 60 cycles per minute.

The improved conjugate suspension system virtually eliminates the "kick" that normally occurs between orthodox front and rear suspensions, and affords a smooth harmonic ride in the pitching mode, the improvement achieved being especially apparent to passengers in the rear of the vehicle. A further advantage is that in cornering, when the outer wheels are more heavily loaded, the hydraulic equalisation of the transient load increment on those wheels gives markedly greater adhesion, especially on rough surfaces.

In the bounce condition of the suspension (FIG. 3), liquid is displaced from the interconnected front and rear displacer units 2, 2A at the same time, and the displaced liquid is accommodated by corresponding distension of the bore of the resilient hose 7. The latter, as already pointed out, constitutes a hydraulic accumulator. The restoring force in the bounce mode of the suspension is provided by the hydraulic pressure increment (which attains its maximum in this case) in the interconnecting hose 7, as well as by the rear suspension geometry and the variable-area diaphragm factor mentioned before. In consequence, the suspension frequency in the bounce mode is higher than in the pitching mode and may be of the order of 100 cycles per minute. This is a valuable attribute because, the bounce and roll modes being directly related, the suspension can possess adequate roll stiffness, both front and rear, without using anti-roll bars.

In the case of conventional motor cars which (whether with front wheel drive or rear wheel drive) have the power unit at the front, the front end is more heavily loaded than the rear. Therefore, it has become usual to equip the front suspension with an anti-roll bar to improve the handling qualities of the vehicle which would otherwise be unsatisfactory by reason of the necessity to have the front suspension softer than the rear in order to secure a reasonably flat ride. In contrast, the suspension system of the present invention, by virtue of its differential interaction between the front and rear wheel suspensions at the same side of the vehicle, does not necessitate a softer action at the front than at the rear. Therefore, the suspension rate at the front can appropriately be made higher than that at the rear by employing a smaller mechanical advantage in the front suspension linkage than in the rear suspension linkage, with the advantageous result that the roll stiffness at the front becomes higher than at the rear.

In the pitching mode (FIG. 2) the damping of the suspension by the action of the damper valves 8 is supplemented by the effect of the viscous flow of the liquid in the hose 7. The damping is resistant to "fade," owing to the relatively large quantity of liquid in the system and the fact that the viscosity of water, which is the liquid preferred, does not vary so much with change of temperature as does that of oil, which is the liquid used in conventional hydraulic dampers.

As can be seen from the plan view (FIG. 4) of the practical embodiment the two hydraulic systems are arranged in the same way at the respective sides of the vehicle, and the four displacer units 2, 2A are each individual to one of the road wheels. It is solely a matter of convenience in installation that the front displacer units 2 are disposed vertically, and the rear units 2A horizontally. The front suspension comprises upper and lower transverse control arms 3 and 12, the strut 11 associated with each front displacer unit 2 is ball-jointed to the upper control arm 3, and the head 9 of each unit 2 bears against an abutment 13 on the underframe 1.

The rear suspension comprises, for each wheel 6, a universally-jointed drive-shaft 14 and the trailing arm 5. The latter, which is pivotally mounted at 15 on the underframe 1, has a ball-jointed connection at 16 to the strut 11 of the associated rear displacer unit 2A. The head 9 of each of these units bears against, and is secured to, an abutment constituted by a transverse member 17 of the underframe 1.

The two hydraulic hoses 7 have to be firmly anchored in place and, as in the case of the arrangement illustrated in FIGURES 4 and 5, this may conveniently be achieved by encasing the major portion of the length of each hose in a steel tube 18 which is secured to the underframe 1, and which may also serve to afford the requisite limitation of the radial distension of the bore of the resilient hose.

In its preferred design the hose unit 7, which constitutes the bounce spring of the suspension, comprises a thick-walled tubular rubber extrusion 19 (FIGS. 6 to 9) formed at its outer periphery with elastically-deformable elements constituted by equi-spaced external ribs 20. These extend longitudinally throughout the length of the extrusion, except at its end zones where terminal fittings 21 and 22 are provided for effecting connection to the associated front and rear displacer units. The fluted rubber hose is encased in a snugly-fitting and relatively rigid sleeve 23 which serves to limit radial and longitudinal distension of the hose bore under internal hydraulic pressure. In this example the sleeve 23 is made of woven steel braid, but it could take other forms (e.g. the steel tube 18 of FIGURES 4 and 5, textile braiding, spirally-wound tubing reinforced with fabric or paper, or an interlocked spiral as used in gas-tubing).

As can be seen from FIGURE 7, in the "free" condition the ribs 20 are of approximately square section, and are spaced apart sufficiently to permit complete deformation under radial pressure.

In the statically-loaded condition, represented in FIGURES 6 and 8, the bore of the rubber hose is enlarged owing to the distension of the wall 19 under the static hydraulic pressure in the system. It will be apparent from FIGURE 8 that the ribs 20 have now become deformed, but the residual gaps between them are still sufficient to permit further deformation to occur. Such further deformation is exhibited in FIGURE 9, which represents the state of affairs in the "bump" condition. The bore of the rubber hose has become further enlarged, because the hydraulic pressure has now attained its maximum value, causing the ribs 20 (which act as rubber compression springs) to be deformed to such an extent that they almost completely eliminate the previously intervening gaps.

The end fittings 21, 22 (FIG. 6) follow standard hose practice. A short metal sleeve 24 is crimped so as to secure the braided sleeve 23 and clamp the end zones of the rubber hose 19 around a corrugated nozzle 25. Although not indicated in the drawings, it is desirable to provide the hose unit 7 with a protective covering, such as polythene tubing, when the restraining sleeve 23 is made of steel braid. The protective covering, which should extend over the metal sleeves 24 as well, not only renders the hose unit better for handling but obviates the risk of chafing when installed in the vehicle.

Comparison of the typical load/deflection curves (FIGS. 10 and 11), for the rear and front wheels respectively, reveals that the front suspension is stiffer than the rear both in the bouncing and pitching modes. It will be seen also that the rate in the pitching mode is substantially smaller than that in the bounce mode for both the front and rear suspensions.

FIGURE 12 shows the construction of the hydraulic displacer units 2, 2A. The flexible diaphragm 10 mentioned earlier is made of reinforced rubber, and is rendered substantially impermeable to liquid by a relatively thin Butyl rubber liner 26 moulded in the same shape as the diaphragm. In its free state the diaphragm takes the form of a truncated 60° cone inverted as indicated at 10A. The rigid head 9 of the displacer unit is constituted by a sheet metal pressing in the form of a domed circular cap, the edge zone of which is spun over at 27 to entrap the bead 28 of the diaphragm and the liner 26 in hermetically-sealed fashion, together with a sheet metal skirt 29 of tapered form.

The diaphragm 10 is moulded with a central protuberance 30 which locates in a cavity 31 of corresponding shape in a piston 32. The latter, which is tapered at 33 reversely to the taper of the skirt 29, is attached to the mouth of the trumpet-shaped strut 11. Owing to the tapered formation of the skirt 29 and the piston 32, the effective area of the diaphragm 10 varies with the piston travel. The effective area increases as the piston 32 moves inwardly, i.e. towards the head 9 of the displacer unit. As mentioned previously, the strut 11 is ball-jointed to the corresponding wheel-suspension linkage, which, for the present purpose will be assumed to be the upper control arm 3 of the front suspension. The ball-joint is constituted by a ball-end 34 fitted to the strut 11 and bearing on a seating 35 of nylon or other appropriate material housed in a steel cup 36 which is mounted on the suspension control arm 3. The ball-joint is packed with grease on assembly and is fitted with a protective rubber seal 37 to exclude mud or grit.

Figure 13:
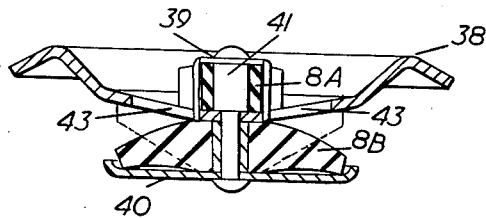
FIGURE 13 is a sectional side elevation of a damper valve assembly that is incorporated in the displacer unit of FIGURE 12.
Figure 14:
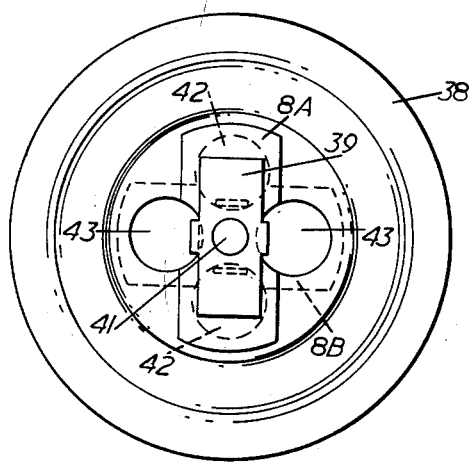
FIGURE 14 is a plan view of the damper valve assembly.

The domed head 9 of the displacer unit, in conjunction with the dished formation of the piston 32, enables the previously mentioned two-way damper valves 8 to be accommodated within the displacer unit, as shown, there being adequate clearance at full bump stroke of the piston. The damper valves' assembly is carried by a dished plate 38 secured to the underside of the head 9 of the displacer unit. Two oppositely-acting rubber flap damper valves 8A, 8B (see also FIGS. 13 and 14) are disposed substantially at right angles to each other on opposite sides of the intermediate plate 38, and are mounted between limiting plates 39, 40 on a shouldered central stud 41. The plate 38 has a pair of ports 42 (FIG. 14) associated with the valve 8A which controls the upward flow of liquid through those ports during the bump stroke of the piston 32. That plate also has a second pair of ports 43, these being associated with the valve 8B that controls the downward flow of liquid through those ports during the rebound stroke of the piston 32.

The rubber flap valves 8A, 8B are so shaped that they become initially pre-loaded against the intermediate plate 38 upon assembly. This pre-loading controls the initial opening of the respective valves (i.e. the time-setting in hydraulic damper parlance); and the stiffness of the rubber flap controls the final opening (i.e. blow-off setting).

The configuration of the rebound valve 8B when it is at rest, fully closing the ports 43, is indicated in dotted outline. The bump valve 8A, of course, assumes a corresponding setting when it fully closes the ports 42. The initial opening of either valve is controlled by the stiffness of the rubber flap in bending. The damping force at the high velocities of liquid flow involved is controlled by the orifice size and the abutment of the flap valves on their respective limiting plates. Different damping characteristics in the bump and rebound phases may readily be achieved by making one of the flap valves of harder rubber than the other, or by making the valves of different shapes so that they do not possess the same stiffness in bending. There is virtually no "fading" of the damping efficiency, owing to the relatively large quantity of liquid in the system.

Figure 15:
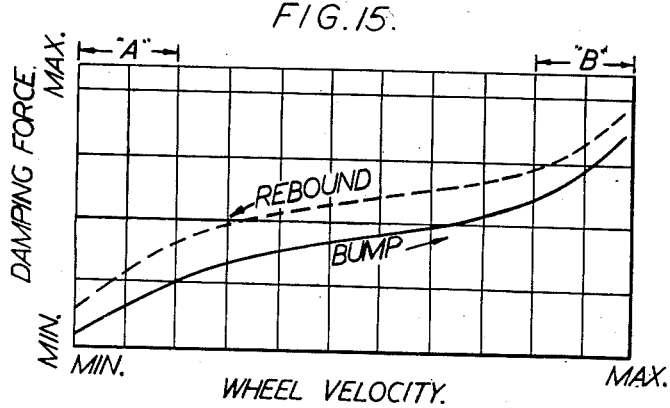
FIGURE 15 shows typical characteristics of the "bump" and "rebound" damper valves respectively.

Typical characteristics of the bump and rebound damper valves are shown in FIGURE 15, in which the damping force is represented by the pressure difference across the damper. Over the zone "A" the damping action is controlled by the stiffness and pre-loading of the respective valve flaps 8A, 8B, and over the zone "B" it is controlled by the limiting plates 39, 40 and by the size of the ports 42, 43.

The head 9 of each of the displacer units 2, 2A is provided with a pipe connection, as indicated at 44 (FIG. 12), for the corresponding end of the hose unit.

It will be recalled that the necessary restoring force in the pitching mode is derived from the geometry of the rear suspension in conjunction with the variable-area effect of the displacer units 2, 2A. In this connection the rear suspension linkages are arranged to incorporate an arrangement according to which the energy required to establish a pitch rate in a suspension system of the character concerned is derived by causing the centre of gravity of the sprung structure to become slightly raised as the vehicle pitches, and utilising its consequent tendency to return to the position of minimum potential energy.

Figure 16:
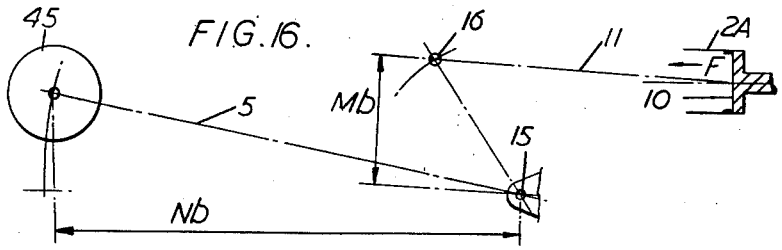
FIGURES 16 to 18 represent diagrammatically the geometry of the suspension linkage of each rear wheel of the vehicle in the "bump," "static" and "rebound" condition respectively.
Figure 17:
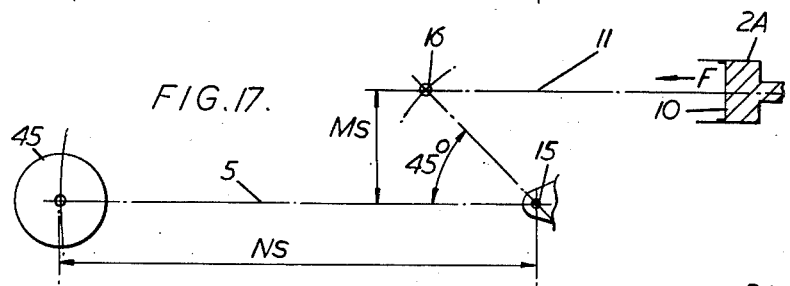
Figure 18:
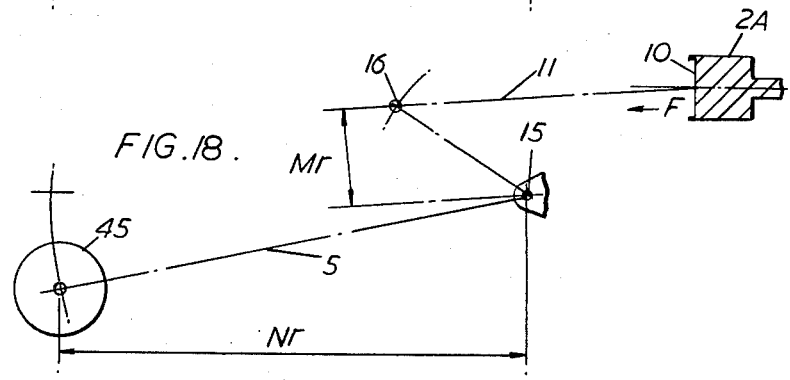

The effect required is obtained by positioning the ball-jointed connection 16 (FIGS. 4, 5, 16, 17, and 18), which is the point of application of the load transmitted by the strut 11 to the displacer unit 2A, so that the line joining it to the pivot 15 of the arm 5 (carrying the association wheel hub 45) is inclined to the horizontal. This disposition results in a decrease of mechanical advantage as the wheel concerned moves from the rebound condition (FIG. 18) to the bump condition (FIG. 16). Although the reaction force exerted by the displacer unit 2A, and designated F in these diagrams, is, in reality, of variable magnitude (owing to the variation of the effective area of the diaphragm with its travel), it is convenient for the purpose of elucidating the rear suspension geometry to assume, as a purely hypothetical matter, that the reaction force F remains constant. This assumption does not affect understanding of the manner in which the rear suspension linkages function.

In the bump condition (FIG. 16) the mechanical advantage of the rear suspension linkage is represented by the ratio $Nb/Mb$, and is a minimum. In the rebound condition (FIG. 18) the mechanical advantage is a maximum, being represented by the ratio $Nr/Mr$. In consequence, a positive rate (indicated by the dotted line P in FIG. 19) is obtained which affords most of that required in the pitching mode of the suspension. The value of this rate can be modified by altering the angle indicated as 45° in FIGURE 17, which represents the rear suspension geometry for the static condition.

Figure 19:
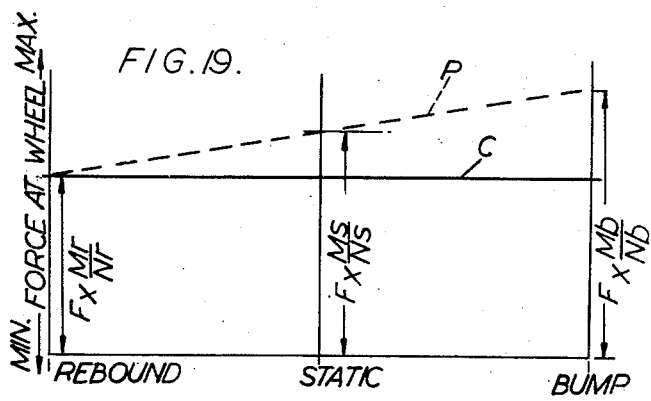
FIGURE 19 represents graphically the relationship of the forces at the wheel in the three conditions, and also shows the positive rate afforded by the rear suspension linkage.

The line designated C in FIGURE 19 represents the purely hypothetical constant reaction force F of the displacer unit assumed to have a constant-area diaphragm.

What we claim is:

1. A suspension system for automotive vehicles comprising a sprung and unsprung structure, a diaphragm-type hydraulic displacer unit connected between said structures and arranged on relative movement of said unsprung structure towards said sprung structure to displace liquid from its interior, said unit comprising a piston member connected to one of said structures and a rigid housing member connected to the other of said structures, at least one of said connections comprising an articulated joint, a rigid partition wall dividing said housing into two subchambers, a flexible diaphragm of rubber-like material closing in part one of said subchambers and bearing against the head of said piston member, said unit including port means disposed in communication with the other of said sub-chambers for allowing passage of liquid to and from the interior of the unit, said rigid partition wall being provided with a plurality of ports providing fluid interconnection between the two sub-chambers, valve means controlling passage of liquid through at least one of said ports in the partition wall, said diaphragm being substantially frusto-conical in shape in its free condition and being substantially M-shaped while in its operating condition, the outer edge of said diaphragm being beaded and being clamped to said rigid housing member, the central apex of the diaphragm lying against and being secured to the surface of the head of the piston member, said last-mentioned surface being substantially M-shaped in cross-section.

2. A suspension system for automotive vehicles comprising a sprung and unsprung structure, a diaphragm-type hydraulic displacer unit connected between said structures and arranged on relative movement of said unsprung structure towards said sprung structure to displace liquid from its interior, said unit comprising a piston member connected to one of said structures and a rigid housing member connected to the other of said structures, at least one of said connections comprising an articulated joint, a rigid partition wall dividing said housing into two sub-chambers, a flexible diaphragm of rubber-like material closing in part one of said sub-chambers and bearing against the head of said piston member, said unit including port means disposed in communication with the other of said sub-chambers for allowing passage of liquid to and from the interior of the unit, said rigid partition wall being provided with a plurality of ports providing fluid interconnection between the two sub-chambers, valve means controlling passage of liquid through at least one of said ports in the partition wall, said rigid housing member comprising a concave cup-like metal pressing having its outer periphery rolled over, the outer periphery of said flexible diaphragm being trapped within the rolled-over periphery of said rigid housing member, said flexible diaphragm being substantially circular in plan view.

3. A suspension system for a four-wheeled automotive vehicle including provision for hydraulically effecting differential interaction between front and rear wheel suspension means located on the same side of the vehicle comprising, a sprung structure, a pair of wheels disposed at each side of said sprung structure, wheel suspension means operatively connected with each of said wheels, a diaphragm-type displacer unit operatively connected with each of said wheel suspension means, conduit means interconnecting the displacer units on each side of the vehicle with one another to provide a completely liquid-filled hydraulic system at each side of said sprung structure, each of said units comprising a completely liquid-filled chamber, defined in part by a rigid housing attached to said sprung structure, said chamber being further defined by a flexible diaphragm, a piston member connected for movement with the associated wheel during operation of the suspension system, the head of said piston member bearing against said flexible diaphragm, a rigid partition wall dividing said liquid-filled chamber into at least two completely liquid-filled sub-chambers, one of said sub-chambers being frontally closed by said diaphragm and rearwardly closed by said partition wall, said conduit means being disposed in communication with the other sub-chamber of each of said units to provide intercommunication between the other sub-chambers of the interconnected units on the same side of said sprung structure, said partition wall of each unit having formed therethrough a plurality of ports providing communication between the sub-chambers of the unit, a first rubber flap disposed within said one chamber and resiliently covering at least one of said ports, and a second rubber flap disposed within said other chamber and resiliently covering at least another of said ports, whereby passage of liquid through each of said ports is prevented by the associated flap in one direction and resiliently resisted in the opposite direction.

4. A suspension system as defined in claim 3, including means for providing a relatively small restoring force in the pitching mode wherein the diaphragm of each displacer unit is so constructed and arranged that the effective area thereof is variable during its travel and as the effective diaphragm area increases in one displacer unit, it decreases in the interconnected displacer unit at the opposite end of the sprung structure, and wherein each of the wheel suspension linkages between a pair of displacer units and their associated wheels at one end of the sprung structure includes means for decreasing the mechanical advantage at which the unit acts against the wheel of the linkage concerned as the latter moves from the bump to the rebound condition.

5. A system according to claim 4, wherein said diaphragm is substantially frusto-conical in shape in its free condition and being substantially M-shaped while in its operating condition, each of said units including a rigid housing member, the outer edge of said diaphragm being beaded and being clamped to said rigid housing member, the central apex of the diaphragm lying against and being secured to the surface of the head of the piston member, said last-mentioned surface being substantially M-shaped in cross-section.

6. A system as defined in claim 4, wherein each of said displacer units includes a rigid housing comprising a concave-cup-like metal pressing having its outer periphery rolled over, the outer periphery of said flexible diaphragm being trapped within the rolled-over periphery of said rigid housing member, said flexible diaphragm being substantially circular in plan view.

References Cited in the file of this patent

UNITED STATES PATENTS

| | | |
|---|---|---|
| 2,694,569 | Gouirand | Nov. 16, 1954 |
| 2,713,498 | Brown | July 19, 1955 |
| 2,939,698 | Polhemus | June 7, 1960 |

FOREIGN PATENTS

| | | |
|---|---|---|
| 211,064 | Australia | Oct. 25, 1957 |
| 807,138 | Great Britain | Jan. 7, 1959 |
| 554,552 | Italy | Jan. 12, 1957 |